US011921535B2

(12) United States Patent
Krishnan

(10) Patent No.: US 11,921,535 B2
(45) Date of Patent: Mar. 5, 2024

(54) BANDGAP REFERENCE CIRCUIT

(71) Applicant: TEXAS INSTRUMENTS INCORPORATED, Dallas, TX (US)

(72) Inventor: Sandeep Shylaja Krishnan, Kozhikode (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/514,433

(22) Filed: Oct. 29, 2021

(65) Prior Publication Data

US 2023/0139284 A1 May 4, 2023

(51) Int. Cl.
*G05F 3/26* (2006.01)

(52) U.S. Cl.
CPC .................................... *G05F 3/265* (2013.01)

(58) Field of Classification Search
CPC . G05F 3/265; G05F 3/267; G05F 3/30; G05F 3/26; G05F 3/247; G05F 3/245; G05F 3/242
See application file for complete search history.

(56) References Cited

U.S. PATENT DOCUMENTS 4,348,633 A * 9/1982 Davis ........................ G05F 3/30 327/54
7,230,473 B2 * 6/2007 Tadeparthy ............... G05F 3/30 327/539
7,541,862 B2 * 6/2009 Fujisawa ................... G05F 3/30 327/542

* cited by examiner

*Primary Examiner* — Nguyen Tran
(74) *Attorney, Agent, or Firm* — Ray A. King; Frank D. Cimino

(57) ABSTRACT

A bandgap reference circuit includes an amplifier, a first transistor, a second transistor, a third transistor, a first resistor, and a second resistor. The amplifier is configured to generate a bandgap voltage. The first transistor is coupled to the amplifier, and passes a first PTAT current. The second transistor is coupled to the amplifier, and passes a second PTAT current. The first resistor is coupled to the amplifier and the second transistor, and passes the second PTAT current to the second transistor. The third transistor is coupled to the amplifier, and passes a third PTAT current that bypasses the first resistor and the second transistor. The second resistor is coupled to the first transistor, the second transistor, and the third transistor, and passes the first PTAT current, the second PTAT current, and the third PTAT current.

20 Claims, 3 Drawing Sheets

BANDGAP REFERENCE CIRCUIT

CROSS-REFERENCE TO RELATED APPLICATIONS

This application incorporates by reference, in its entirety, India Provisional Application No. 202041019319, filed May 6, 2020, entitled "Method for High Precision in Bandgap Reference at Low Area."

BACKGROUND

Many circuits and devices (e.g., analog-to-digital converters), need a precise reference voltage to operate. A bandgap reference circuit may be used to generate such a reference voltage. Bandgap voltage reference circuits generate a temperature-stable voltage by combining a p-n junction voltage with a thermal voltage. A bandgap reference circuit generates a complementary-to-absolute-temperature (CTAT) voltage and a proportional-to-absolute-temperature (PTAT) voltage. The CTAT voltage decreases with increasing temperature (i.e., the CTAT voltage has a negative temperature coefficient), and the PTAT voltage increases with increasing temperature (i.e., the PTAT voltage has a positive temperature coefficient). The bandgap reference circuit combines the PTAT and CTAT voltages such that their respective temperature coefficients cancel each other out to produce a temperature stable voltage.

SUMMARY

In one example, a bandgap reference circuit includes an amplifier, a first transistor, a second transistor, and a third transistor. The amplifier includes a first input and a second input. The first transistor includes a first current terminal, a second current terminal, and a control terminal. The first current terminal is coupled to the first input of the amplifier. The second current terminal is coupled to ground. The second transistor includes a first current terminal, a second current terminal, and a control terminal. The first current terminal of the second transistor is coupled to the control terminal of the first transistor and the second input of the amplifier. The second current terminal of the second transistor is coupled to the second current terminal of the first transistor. The control terminal of the second transistor is coupled to the second input of the amplifier. The third transistor includes a first current terminal, a second current terminal, and a control terminal. The first current terminal of the third transistor is coupled to the first input of the amplifier. The second current terminal of the third transistor is coupled to the second current terminal of the first transistor. The control terminal of the third transistor is coupled to the control terminal of the second transistor.

In another example, a bandgap reference circuit includes an amplifier, a first transistor, a second transistor, a third transistor, a first resistor, and a second resistor. The amplifier is configured to generate a bandgap voltage. The first transistor is coupled to the amplifier, and is configured to pass a first proportional to absolute temperature (PTAT) current. The second transistor is coupled to the amplifier, and is configured to pass a second PTAT current. The first resistor is coupled to the amplifier and the second transistor, and is configured to pass the second PTAT current to the second transistor. The third transistor is coupled to the amplifier, and is configured to pass a third PTAT current that bypasses the first resistor and the second transistor. The second resistor is coupled to the first transistor, the second transistor, and the third transistor, and is configured to pass the first PTAT current, the second PTAT current, and the third PTAT current.

In a further example, a data acquisition system includes an analog-to-digital converter (ADC), and a reference voltage circuit. The reference voltage circuit is coupled to the ADC. The reference voltage circuit includes a bandgap reference circuit. The bandgap reference circuit includes a first transistor, a second transistor, a third transistor, a first resistor, and a second resistor. The first transistor is configured to pass a first PTAT current. The second transistor is configured to pass a second PTAT current. The first resistor is coupled to the second transistor, and is configured to pass the second PTAT current to the second transistor. The third transistor is configured to pass a third PTAT current that bypasses the first resistor and the second transistor. The second resistor is coupled to the first transistor, the second transistor, and the third transistor, and is configured to pass the first PTAT current, the second PTAT current, and the third PTAT current.

DETAILED DESCRIPTION

Figure 1:
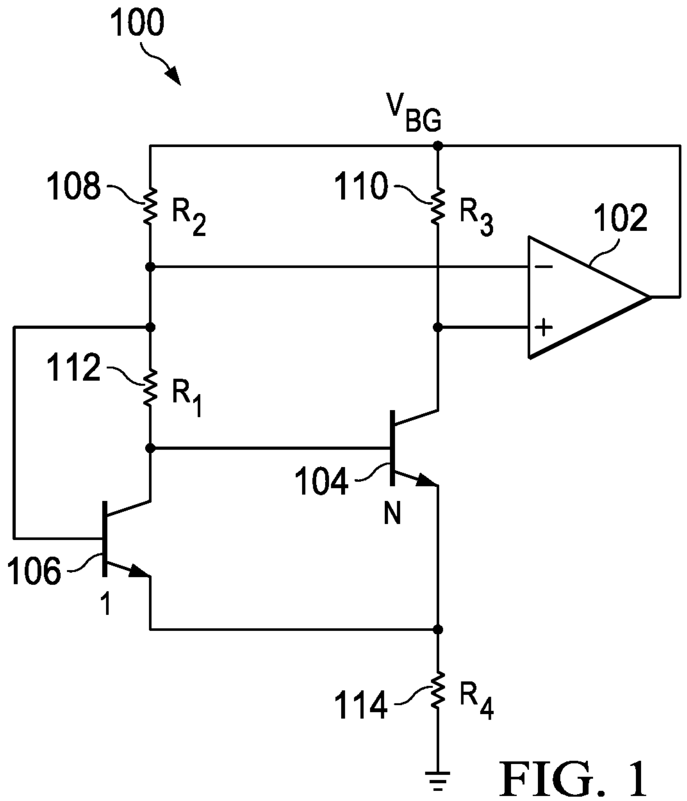
FIG. 1 is a schematic level diagram for an example bandgap reference circuit.

FIG. 1 is a schematic level diagram for an example bandgap reference circuit 100. The bandgap reference circuit 100 includes an amplifier 102, a transistor 106, a transistor 104, a resistor 108, a resistor 110, a resistor 112, and a resistor 114. The transistor 106 and the resistor 108 may be NPN bipolar junction transistors. The emitter area of the transistor 104 may be N times greater than the emitter area of the transistor 106. For example, the transistor 104 may include N transistors that are similar or identical to the transistor 106. A bandgap voltage ($V_{BG}$) is provided at the output of the amplifier 102. The bandgap voltage is the sum of a complementary to absolute temperature (CTAT) voltage provided at a first input (non-inverting input) of the amplifier 102, and proportional to absolute temperature (PTAT) voltage provided at a second input (inverting input) of the amplifier 102.

$$V_{BG}=V_{BE,Q0}+V_T\ln(N)*K$$

The CTAT voltage is the base-emitter voltage of the transistor 104 ($V_{BE,Q0}$). The PTAT voltage is the difference of the $V_{BE}$ of the transistor 104 and the $V_{BE}$ of the transistor 106 provided across the resistor 112. With the same current flowing in the transistor 104 and the transistor 106, the PTAT voltage may be expressed as:

$$V_T\ln(N)*K$$

where:

$V_T$ is the thermal voltage of the transistor 104 or the transistor 106;

N is the emitter area of the transistor 104 relative to the emitter area of the transistor 106 (e.g., N=8 if the emitter area of the transistor 104 is 8 times that of the transistor 106); and $$K = 1 + \frac{(2R4 + R2)}{R1}$$

where:

R1 is the resistance of the resistor 112;

R2 is the resistance of the resistor 108; and

R4 is the resistance of the resistor 114.

In the bandgap reference circuit 100, noise and offset from the amplifier 102 scale by K, and increasing N reduces K and reduces output noise. Thus, increasing N or reducing K, without impacting quiescent current ($I_q$) or increasing circuit area are desirable. N may be increased by skewing the current in the transistors 104 and transistor 106. If $$\frac{R_3}{R_2} = N_1,$$

where $R_3$ is the resistance of the resistor 110, then PTAT voltage is:

$$V_T \ln(N * N_1) * K$$

where:

$$K = 1 + \frac{\left(\left(1 + \frac{1}{N_1}\right)R4 + R2\right)}{R1}$$

Figure 2:
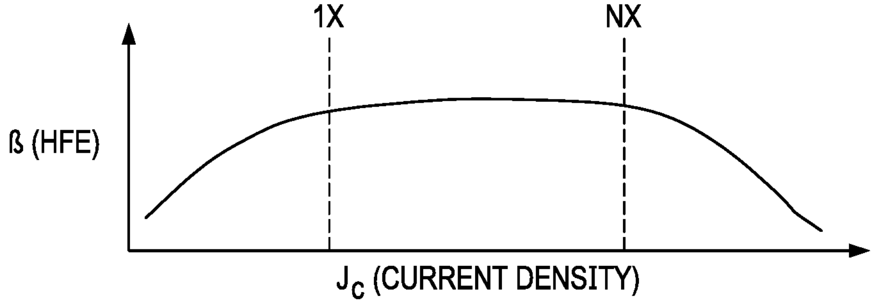
FIG. 2 is a graph of β (or $H_{FE}$) variation of a transistor with current density.

With PTAT voltage equal to $V_T \ln(N*N_1)*K$, increasing $N*N_1$ is one method for reducing noise. However, increasing $N*N_1$ increases the current density (Jc) in the transistor 106. There is a limit to increasing the current density as the transistor 106 enters non ideal operation and $\beta = I_C/I_B$ reduces. This problem also exists in low quiescent current designs where current density in the transistor 106 is kept fixed and current density in the transistor 104 is reduced. FIG. 2 is a graph of β (or $H_{FE}$) variation of a BJT with current density. If a transistor (e.g., the transistor 104 or the transistor 106) is biased outside the relatively flat plateau of the curve shown in FIG. 2, then errors are introduced in the bandgap reference. For example, the PTAT nature of biasing in the bandgap reference circuit 100 causes current density to vary with temperature. As a result, β related errors vary with temperature and introduce temperature drift error in the output voltage. Temperature drift is an important specification for a precision reference.

Examples of bandgap reference circuits that increase PTAT current using mirror circuitry, and without increasing the size of the transistor 104 will now be described. Increasing the PTAT current reduces the scale factor value K, which reduces noise in the bandgap voltage output. The bandgap reference circuits that include mirror circuitry are smaller than circuits that provide an equivalent increase in PTAT current by increasing the size (emitter area) of the transistor 104.

Figure 3:
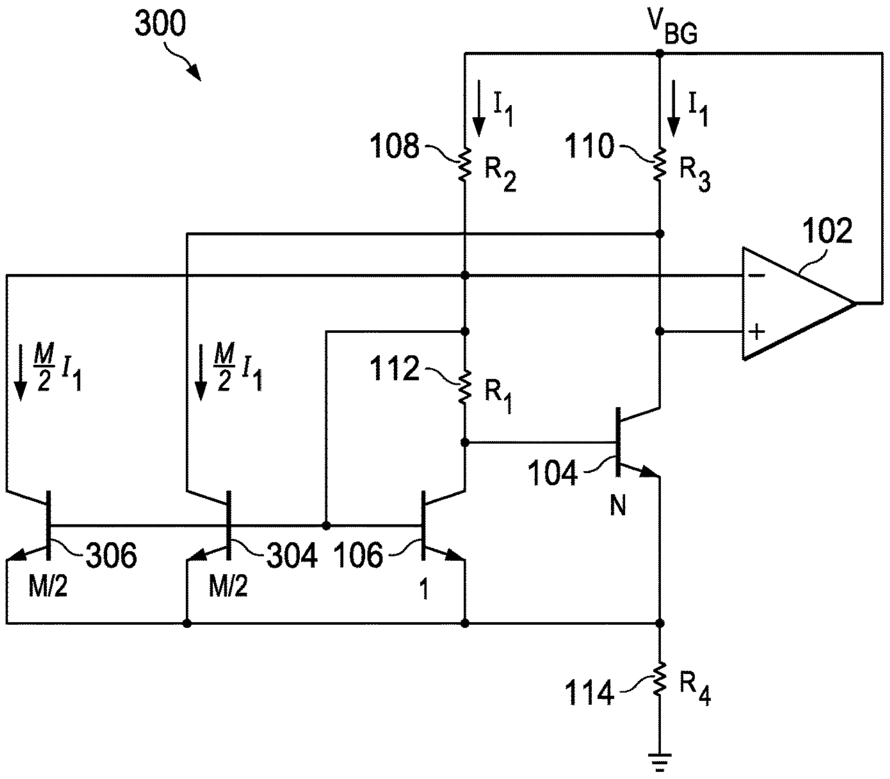
FIG. 3 is a schematic level diagram for an example bandgap reference circuit that includes current mirrors to increase proportional to absolute temperature (PTAT) current.

FIG. 3 is a schematic level diagram for an example bandgap reference circuit 300 that includes current mirrors to increase PTAT current. The bandgap reference circuit 300 includes the amplifier 102, the transistor 106, the transistor 104, the resistor 108, the resistor 110, the resistor 112, the resistor 114, the mirror transistor 304, and the mirror transistor 306. Each of the mirror transistor 304 and the mirror transistor 306 may be formed as M/2 copies of the transistor 106. The bandgap voltage is provided at the output of the amplifier 102. Addition of the mirror transistor 304 and the mirror transistor 306 splits bandgap PTAT current into a mirrored branch. The mirror transistor 304 and the mirror transistor 306 mirror and scale up the PTAT current flowing through the transistor 106. Net PTAT current flowing through the resistor 114 is:

$$(M+2)*I_1.$$

where:

M is the combined emitter area of the mirror transistor 304 and the mirror transistor 306 relative to the emitter area of the transistor 106; and $I_1$ is PTAT current flowing through the transistor 106 ( $I_1$ also flows through the transistor 104).

Addition of the mirror transistors provides larger PTAT current for a given resistance of the resistor 112 and transistor area, and provides a substantial reduction of the scaling factor K relative to increasing the emitter area of the transistor 104. For example, assume that emitter size N of the transistor 104 is increased to N+M, then K reduces by:

$$\frac{\ln(N * N_1 + M)}{\ln(N * N_1)}.$$

Instead, with addition of the mirror transistor 304 and the mirror transistor 306, providing emitter size M, K reduces by:

$$\frac{\left(\left(1 + \frac{1}{N_1}\right) + M\right)}{\left(1 + \frac{1}{N_1}\right)}.$$

This implies that for the same total transistor area of N+M, use of mirroring as in the bandgap reference circuit 300 provides a ratio of improvement of K of:

$$\left(\frac{1 + \frac{1}{N_1} + M}{1 + \frac{1}{N_1}}\right)\left(\frac{\ln N * N_1}{\ln N * N_1 + M}\right)$$

relative to conventional techniques. For example, if N=24, $N_1$=2, and M=24, the improvement by addition of the mirror transistors is 13.8×. If N=24, $N_1$=2, and M=4, the improvement by addition of the mirror transistors is 3.7×.

The output of the amplifier 102 is coupled to a first terminal of the resistor 108 and a first terminal of the resistor 110. A second terminal of the resistor 110 is coupled a non-inverting input of the amplifier 102 and a first current terminal (collector) of the transistor 104. A second current terminal (emitter) of the transistor 104 is coupled to a first terminal of the resistor 114. A second terminal of the resistor 114 is coupled to ground. A PTAT current flows through the resistor 110, the transistor 104, and the resistor 114.

A second terminal of the resistor 108 is coupled to a first terminal of the resistor 112. A second terminal of the resistor 112 is coupled to a control terminal (base) of the transistor 104 and a first current terminal (collector) of the transistor 106. A second current terminal (emitter) of the transistor 106 is coupled to the second current terminal of the transistor 104.

The mirror transistor 304 mirrors the PTAT current flowing through the transistor 104. A first current terminal (collector) of the mirror transistor 304 is coupled to the first current terminal of the transistor 104. A second current terminal (emitter) of the mirror transistor 304 is coupled to the second current terminal of the transistor 104. A control terminal of the mirror transistor 304 is coupled to the control terminal of the transistor 106. PTAT current flowing through the mirror transistor 304 bypasses the transistor 104.

The mirror transistor 306 mirrors the PTAT current flowing through the transistor 106. A first current terminal (collector) of the mirror transistor 306 is coupled to the first terminal of the resistor 112. A second current terminal (emitter) of the mirror transistor 306 is coupled to the second current terminal of the transistor 104. A control terminal of the mirror transistor 304 is coupled to the control terminal of the transistor 106. PTAT current flowing through the mirror transistor 306 bypasses the resistor 112 and the transistor 106.

Figure 4:
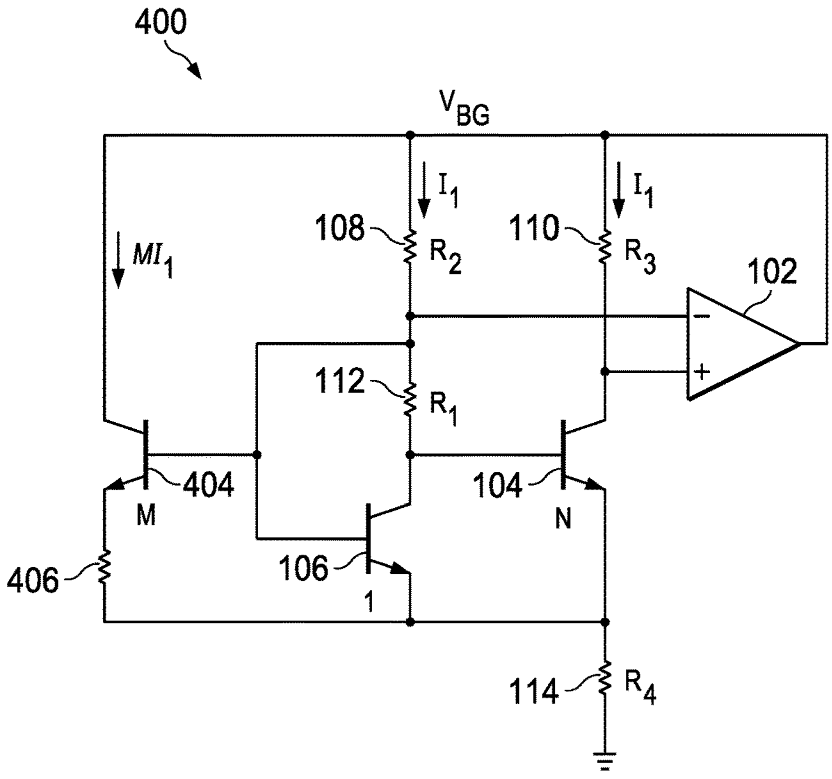
FIG. 4 is a schematic level diagram for an example bandgap reference circuit that includes current mirroring to increase PTAT current, and a matching resistor.

FIG. 4 is a schematic level diagram for an example bandgap reference circuit 400. The bandgap reference circuit 400 includes the amplifier 102, the transistor 106, the transistor 104, the resistor 108, the resistor 110, the resistor 112, the resistor 114, a mirror transistor 404, and a resistor 406. The mirror transistor 404 may be formed as M copies of the transistor 106. The bandgap voltage is provided at the output of the amplifier 102. Addition of the mirror transistor 404 splits bandgap PTAT current into a mirrored branch. The mirror transistor 404 mirrors and scales up the PTAT current flowing through the transistor 106. Net PTAT current flowing through the resistor 114 is:

$$(M+2)*I_1,$$

where M is the emitter area of the mirror transistor 404 relative to the emitter area of the transistor 106.

A first current terminal (collector) of the mirror transistor 404 is coupled to the output of the amplifier 102. A control terminal of the mirror transistor 404 is coupled to the control terminal of the transistor 106. A second current terminal (emitter) of the mirror transistor 404 is coupled to a first terminal of the resistor 406. A second terminal of the resistor 406 is coupled to the first terminal of the resistor 114. The resistance of the resistor 406 may be selected to produce a desired value of IPTAT current flow in the mirror branch. For example, the resistor 406 may be selected to compensate for various errors in the bandgap reference circuit 400.

Figure 5:
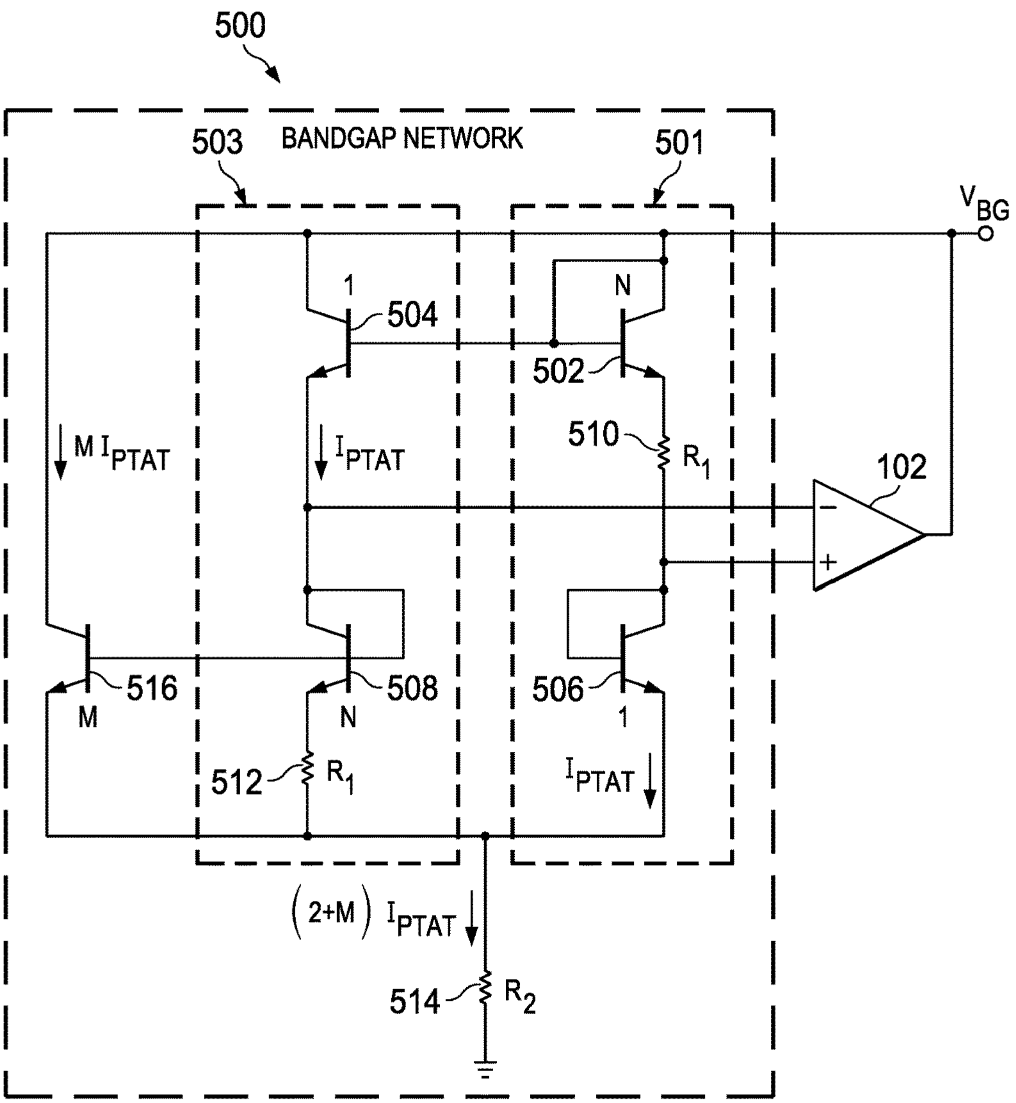
FIG. 5 is a schematic level diagram for an example bandgap reference circuit that includes inverted bandgap pairs with current mirroring to increase PTAT current.

FIG. 5 is a schematic level diagram for an example bandgap reference circuit 500. The bandgap reference circuit 500 includes the amplifier 102, a bandgap pair 501, a bandgap pair 503, a resistor 514, and a mirror transistor 516. The bandgap pair 501 includes a transistor 502, a transistor 506, and a resistor 510. A first current terminal (collector) of the transistor 502 is coupled to the output of the amplifier 102. A control terminal (base) of the transistor 502 is coupled to the first current terminal of the transistor 502 (the transistor 502 is configured as a diode). A second current terminal (emitter) of the transistor 502 is coupled to a first current terminal (collector) of the transistor 506 via the resistor 510. The first current terminal of the transistor 506 is coupled to a first input (non-inverting input) of the amplifier 102. A second current terminal (emitter) of the transistor 506 is coupled to a first terminal of the resistor 514. A second terminal of the resistor 514 is coupled to ground.

The bandgap pair 503 includes a transistor 504, a transistor 508, and a resistor 512. The bandgap pair 503 is structurally inverted with respect to the bandgap pair 501. That is, the diode connected transistor 508 is at the bottom of the bandgap pair 503, while the diode-connected transistor 502 is at the top of the bandgap pair 501. The emitter area of the transistor 502 may be N time greater than the emitter area of the transistor 504. A first current terminal (collector) of the transistor 504 is coupled to the output of the amplifier 102. A control terminal (base) of the transistor 504 coupled to the control terminal of the transistor 502. A second current terminal (emitter) of the transistor 504 is coupled to the second input (inverting input) of the amplifier 102, and to a first current terminal (collector) of the transistor 508. A control terminal (base) of the transistor 508 is coupled to the first current terminal of the transistor 508 (the transistor 508 is configured as a diode). A second current terminal (emitter) of the transistor 508 is coupled to a first terminal of the resistor 512. A second terminal of the resistor 512 is coupled to the first terminal of the resistor 514. The emitter area of the transistor 508 may be N time greater than the emitter area of the transistor 506.

The mirror transistor 516 mirrors the PTAT current flowing though the bandgap pair 501 and the bandgap pair 503. The emitter area of the mirror transistor 516 may be M times greater than the emitter area of the transistor 506. Addition of the mirror transistor provides larger PTAT current for a given resistance ($R_1$) of the resistors 510 and 512 and transistor area, and provides a substantial reduction of the scaling factor K relative to increasing the emitter area of the transistors 502 and 508. A first current terminal (collector) of the mirror transistor 516 is coupled to the output of the amplifier 102. A control terminal (base) of the mirror transistor 516 is coupled to the control terminal of the transistor 508. A second current terminal (emitter) of the mirror transistor 516 is coupled to the first terminal of the resistor 514.

With addition of the mirror transistor 516, the PTAT current flowing in the resistor 514 is:

$$(2+M)I_{PTAT},$$

where $I_{PTAT}$ is the PTAT current flowing through the bandgap pair 501 and the bandgap pair 503. As in all of the example bandgap reference circuits described herein, use of a mirror transistor to increase PTAT current reduces the output noise of the bandgap reference circuit while reducing the circuit area needed to produce the PTAT current relative to other techniques.

Figure 6:
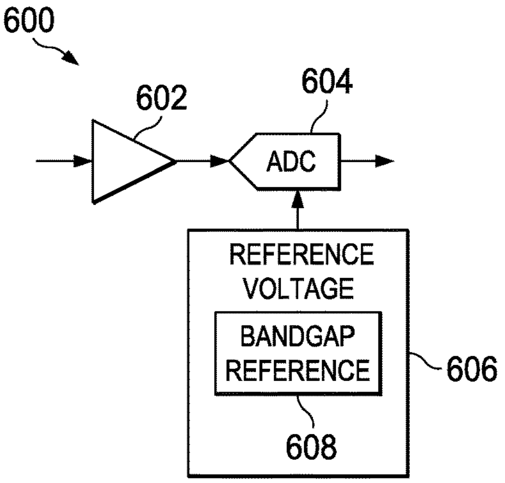
FIG. 6 is a block diagram for a data acquisition system that includes the bandgap reference circuit of FIG. 3.

FIG. 6 is a block diagram for a data acquisition system 600 that includes the bandgap reference circuit with PTAT current mirroring as described herein. The data acquisition system 600 may be implemented in a variety of systems (e.g., medical imaging systems, test and measurement systems, etc.). The data acquisition system 600 includes an amplifier 602, an analog-to-digital converter (ADC) 604 coupled to the amplifier 602, and a reference voltage circuit 606 coupled to the ADC 604. The amplifier 602 provides a signal to be digitized to the ADC 604. The amplifier 602 may be an operational amplifier having single-ended or differential output. The ADC 604 may be any type of ADC that converts an input signal to a digital value. For example, the ADC 604 may be a successive-approximation ADC, a FLASH ADC, a sigma-delta ADC, etc. The reference voltage circuit 606 provides reference voltage to the ADC 604 for use in digitizing the signal received from the amplifier 602. The reference voltage circuit 606 includes a bandgap reference circuit 608 having current mirroring that increases the PTAT current flowing in the reference voltage circuit 606 to reduce noise in the reference voltage provided to the ADC 604. The bandgap reference circuit 608 may be an implementation of the bandgap reference circuit 300, the bandgap reference circuit 400, or the bandgap reference circuit 500.

In this description, the term "couple" or "couples" may cover connections, communications, or signal paths that enable a functional relationship consistent with this description. For example, if device A generates a signal to control device B to perform an action: (a) in a first example, device A is coupled to device B; or (b) in a second example, device A is coupled to device B through intervening component C if intervening component C does not substantially alter the functional relationship between device A and device B, such that device B is controlled by device A via the control signal generated by device A. Also, in this description, the recitation "based on" means "based at least in part on." Therefore, if X is based on Y, then X may be a function of Y and any number of other factors.

Modifications are possible in the described embodiments, and other embodiments are possible, within the scope of the claims.

What is claimed is:

1. A bandgap reference circuit, comprising:

an amplifier having first and second amplifier inputs and an amplifier output;

a first transistor having first and second current terminals and a first control terminal, wherein the first current terminal is connected to the first amplifier input;

a second transistor having third and fourth current terminals and a second control terminal, wherein the third current terminal is coupled to the first control terminal, the fourth current terminal is connected to the second current terminal, and the second control terminal is coupled to the second amplifier input; and a third transistor having fifth and sixth current terminals and a third control terminal, wherein the fifth current terminal is connected to the second amplifier input, the sixth current terminal is connected to the second current terminal, and the third control terminal is coupled to the second control terminal.

2. The bandgap reference circuit of claim 1, further comprising a fourth transistor having seventh and eighth current terminals and a fourth control terminal, wherein the seventh current terminal is coupled to the second amplifier input, the eighth current terminal is connected to the second current terminal, and the fourth control terminal is coupled to the second control terminal.

3. The bandgap reference circuit of claim 1, wherein the bandgap reference circuit includes:

a first resistor coupled between the second amplifier input and the third current terminal; and a second resistor coupled between the amplifier output and the second amplifier input.

4. The bandgap reference circuit of claim 1 wherein the bandgap reference circuit includes a resistor coupled between the amplifier output and the first amplifier input.

5. The bandgap reference circuit of claim 1, further comprising a resistor coupled between the second current terminal and a ground terminal.

6. The bandgap reference circuit of claim 1, further comprising:

a resistor coupled between the sixth current terminal and the second current terminal.

7. The bandgap reference circuit of claim 1, further comprising:

a fourth transistor having seventh and eighth current terminals and a fourth control terminal, wherein the seventh current terminal is coupled to the amplifier output, the eighth current terminal is coupled to the first amplifier input, and the fourth control terminal is coupled to the amplifier output; and a fifth transistor having ninth and tenth current terminals and a fifth control terminal, wherein the ninth current terminal is coupled to the amplifier output, the tenth current terminal is coupled to the second amplifier input, and the fifth control terminal is coupled to the amplifier output.

8. A bandgap reference circuit, comprising:

an amplifier having first and second amplifier inputs and an amplifier output, wherein the amplifier is configured to provide a bandgap voltage at the amplifier output;

a first transistor having first and second current terminals and a first control terminal, wherein the first current terminal is connected to the first amplifier input, and the first transistor is configured to pass a first proportional to absolute temperature (PTAT) current;

a second transistor having third and fourth current terminals and a second control terminal, wherein the third current terminal is coupled to the first control terminal, the fourth current terminal is connected to the second current terminal, and the second control terminal is coupled to the second amplifier input, and the second transistor is configured to pass a second PTAT current;

a first resistor coupled to the amplifier and the second transistor, and configured to pass the second PTAT current to the second transistor;

a third transistor having fifth and sixth current terminals and a third control terminal, wherein the fifth current terminal is connected to the second amplifier input, the sixth current terminal is connected to the second current terminal, and the third control terminal is coupled to the second control terminal, and the third transistor is configured to pass a third PTAT current that bypasses the first resistor and the second transistor; and a second resistor coupled to the second current terminal, the fourth current terminal, and the sixth current terminal, and the second resistor is configured to pass the first PTAT current, the second PTAT current, and the third PTAT current.

9. The bandgap reference circuit of claim 8, wherein a voltage across the first resistor is a difference of base-emitter voltages of the first transistor and the second transistor.

10. The bandgap reference circuit of claim 8, further comprising:

a third resistor coupled between the amplifier output and the first transistor; and a fourth resistor coupled between the amplifier output and the first resistor.

11. The bandgap reference circuit of claim 8, further comprising:

a fourth transistor having a seventh current terminal coupled to the amplifier, wherein the fourth transistor is configured to pass a fourth PTAT current that bypasses the first resistor and the third transistor;

wherein the second resistor is coupled to the fourth transistor, and is configured to pass the fourth PTAT current.

12. The bandgap reference circuit of claim 8, further comprising a third resistor coupled to the third transistor, and configured to pass the third PTAT current to the second resistor.

13. The bandgap reference circuit of claim 8, further comprising:

a fourth transistor coupled between the amplifier and the first transistor, and configured to pass the first PTAT current to the first transistor.

14. The bandgap reference circuit of claim 8, further comprising:

a fourth transistor coupled between the amplifier and the second transistor, and configured to pass the second PTAT current to the second transistor.

15. A bandgap reference circuit, comprising:

a first transistor having first and second current terminals and a first control terminal, wherein the first transistor is configured to pass a first proportional to absolute temperature (PTAT) current;

a second transistor having third and fourth current terminals and a second control terminal, wherein the third current terminal is coupled to the first control terminal, the fourth current terminal is connected to the second current terminal, and the second transistor is configured to pass a second PTAT current;

a first resistor connected between the third current terminal and the second control terminal, and configured to pass the second PTAT current to the second transistor;

a third transistor having fifth and sixth current terminals and a third control terminal, wherein the fifth current terminal is coupled to the second control terminal, the sixth current terminal is connected to the second current terminal, the third control terminal is connected to the second control terminal, and the third transistor is configured to pass a third PTAT current that bypasses the first resistor and the second transistor; and a second resistor coupled between the first, second, and third transistors and a ground terminal, wherein the second resistor is configured to pass the first PTAT current, the second PTAT current, and the third PTAT current.

16. The bandgap reference circuit of claim 15, further comprising:

an amplifier having first and second amplifier inputs and an amplifier output, wherein the first amplifier input is coupled to the first current terminal and the third current terminal, and the second amplifier input is coupled to the third current terminal;

a third resistor coupled between the amplifier output and the first current terminal; and a fourth resistor coupled between the amplifier output and the second amplifier input.

17. The bandgap reference circuit of claim 16, further comprising:

a fourth transistor coupled between the amplifier and the first transistor, and configured to pass the first PTAT current to the first transistor.

18. The bandgap reference circuit of claim 16, further comprising:

a fourth transistor coupled between the amplifier and the second transistor, and configured to pass the second PTAT current to the second transistor.

19. The bandgap reference circuit of claim 15, further comprising:

a fourth transistor having a seventh current terminal coupled to the second current terminal, wherein the fourth transistor is configured to pass a fourth PTAT current that bypasses the first resistor and the third transistor;

wherein the second resistor is coupled to the fourth transistor, and is configured to pass the third PTAT current.

20. The bandgap reference circuit of claim 15, further comprising a third resistor coupled to the third transistor, and configured to pass the third PTAT current to the second resistor.

* * * * *